April 12, 1949. K. RATH 2,467,335
BALANCED VARIABLE FREQUENCY MOTOR CONTROL SYSTEM
Filed June 26, 1947 2 Sheets-Sheet 1
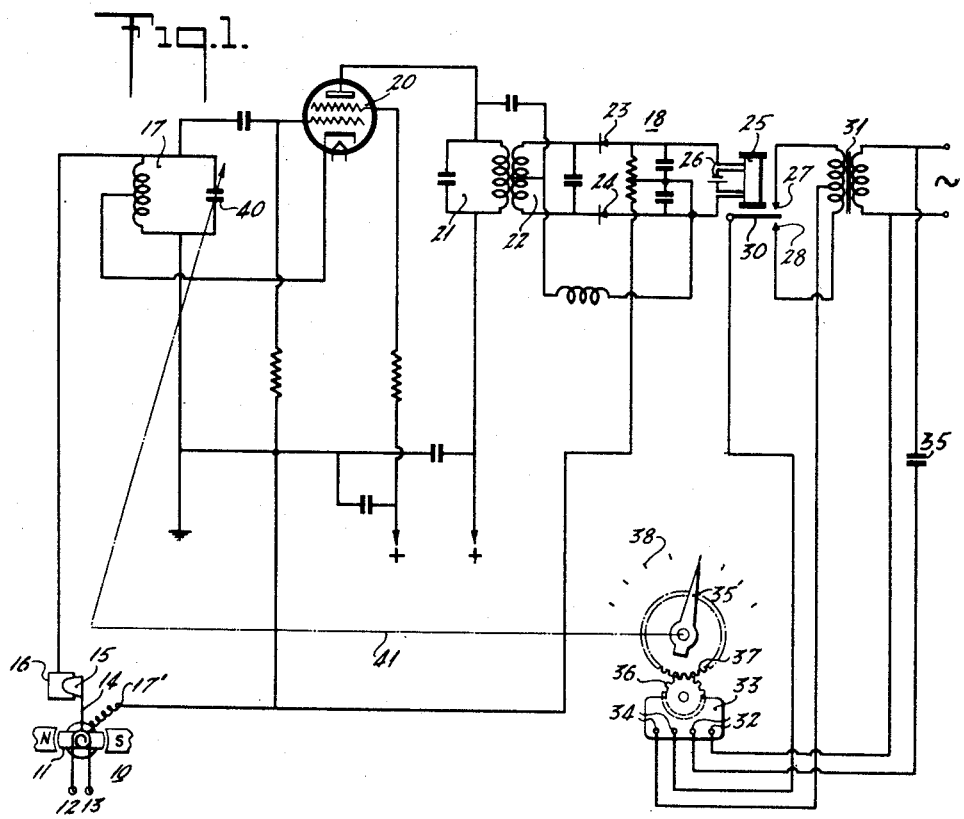
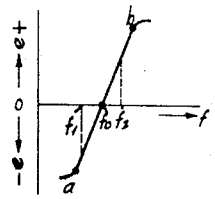
INVENTOR
Karl Rath April 12, 1949.   K. RATH   2,467,335
BALANCED VARIABLE FREQUENCY MOTOR CONTROL SYSTEM
Filed June 26, 1947

INVENTOR
Karl Rath

Patented Apr. 12, 1949

2,467,335

UNITED STATES PATENT OFFICE 2,467,335

BALANCED VARIABLE FREQUENCY MOTOR CONTROL SYSTEM

Karl Rath, New York, N. Y., assignor to Radio Patents Corporation, New York, N. Y., a corporation of New York Application June 26, 1947, Serial No. 757,199

4 Claims. (Cl. 318—28)

This application is a continuation-in-part of application Serial No. 523,027, filed February 19, 1944, now Patent 2,423,617, entitled Continuous balance motor control system.

The present invention relates to continuous balance translating or motor control systems, also known as servo-mechanisms, follow-up devices or torque amplifiers for operating an indicator, recorder, control device or the like in accordance with relatively small changes of a variable input magnitude or condition.

Known arrangements of this type comprise essentially a balanced system adapted to be unbalanced by an initial deflection or variation of a sensitive pilot or leader element, such as a galvanometer or the like to produce an off-balance output current which serves to control an electric motor operating an indicator, recorder or a control device. The motor at the same time is utilized to produce a variable compensating voltage for neutralizing or balancing the galvanometer exciting voltage, in such a manner as to restore and maintain the balance of the system. As a result of this self-balancing action, the movement of the output device follows the variations of the input or leader element continuously and substantially without the effect of intermediate translating elements, such as electric amplifiers and translating circuits, on the accuracy or fidelity of the input-output characteristic of the system.

An object of the present invention is to provide a continuously balanced system of this type which is characterized by the requirement of a minimum of parts and elements, both electrical and mechanical, while insuring extreme sensitivity and stability during operation.

Another object is to provide a translating or torque amplifier system of the above character capable of operating or controlling a comparatively high-power electrical motor which in turn serves to operate a suitable output device, such as an indicator, recorder or steering mechanism, in response to a movement or displacement of a relatively simple leader element operated either manually or in accordance with the variations of electrical input energy, temperature, pressure, level, rate of flow or changes of any other variable input magnitude or condition to be translated or controlled.

With the above and further objects in view, as will become more apparent as the following description proceeds, the invention involves substantially the employment of a frequency balancing method, in addition to other features of improvement embodied in a continuously balanced or follow-up control or translating system of the general type referred to.

The above and further objects and novel aspects of the invention will become more apparent from the following detailed desscription taken in reference to the accompanying drawings forming part of this specification and wherein:

Figure 1 is a schematic circuit diagram of a self-balancing torque amplifier system constructed in accordance with the principles of the invention;

Figure 2 is a graph explanatory of the function and operation of Figure 1; and

Like reference characters identify like parts in the different use of the drawings.

Figure 3:
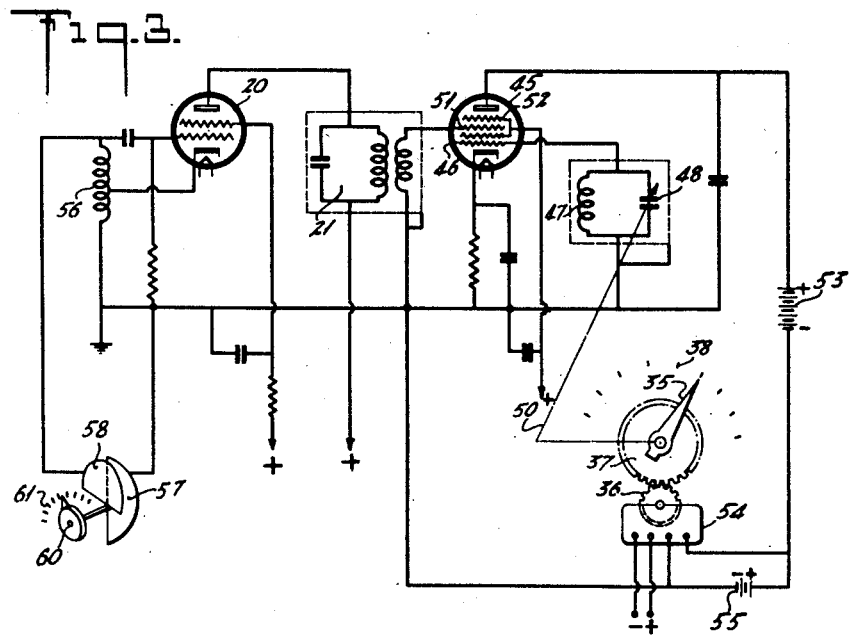
Figures 3 and 4 are diagrams showing modifications of a self-balancing or torque amplifier system constructed in accordance with the invention.

Referring to Figure 1, there is shown a primary or leader element 10 in the form of a sensitive galvanometer comprising a moving coil 11 rotatably mounted between a pair of magnet poles N and S and having input terminals 12 and 13 connected to the coil winding through flexible conductors, such as a pair of balance or torque springs, as is customary in the design and construction of instruments of this type.

The moving coil 11 carries a pointer or equivalent movable member 14 provided with an enlarged end 15 in the form of a thin metal vane constituting an electrode arranged to cooperate with a fixed electrode 16 to form a variable electrical condenser. In order to effect an electrical connection to the electrode 15 or pointer 14, the latter is shown connected to a further terminal 17' through a flexible conductor in a manner well understood. The variable condenser formed by the elements 15 and 16 is effectively connected across the tank circuit 17 of a high frequency oscillator in such a manner as to vary the oscillating frequency as a result of a deflection of the galvanometer from a normal or starting position as shown in the drawing.

The oscillator, in the example shown, is of the so-called electron-coupled type comprising the tank circuit 17 connected to the cathode, control grid and screen grid of a tetrode type electron tube 20 to form a regenerative or self-oscillating circuit and a further tuned circuit 21 inserted in the anode circuit of the tube to supply oscillating energy to a load circuit, in a manner well understood by those skilled in the art.

Assuming, in an arrangement of this type, that the oscillator generates a given frequency $f_0$ as determined by the resonant or tuning frequency of the tank circuit 17, a deflection of the galvanometer pointer 14 in one direction will result in an increase and a deflection of the pointer in the opposite direction will result in a decrease of the capacity of the condenser 15, 16, whereby to cause a corresponding decrease or increase, respectively, of the generated frequency in respect to a normal or starting frequency.

The oscillation frequency deviations are converted into corresponding amplitude variations of an electric current by means of a discriminator or frequency detector 18 of the type having an operating characteristic as shown in Figure 2 and generally known as phase-shift discriminator in the art. Referring to Figure 2, the discriminator output voltage $e$ is plotted as a function of the input frequency $f$ and it is seen that for the normal or center frequency $f_0$, corresponding to the normal or unmodulated frequency of the oscillator, the output voltage of the discriminator is zero and increases substantially linearly in either direction to values $+e$ and $-e$ as a result of an increase or decrease of the oscillating frequency to values $f_2$ and $f_1$, respectively, as a result of a corresponding deflection of the galvanometer or other leader element from its normal operating position. By the proper choice and design of the discriminator characteristic, in particular by employing a discriminator resonant circuit 22 having a sufficiently high "Q," substantial output voltage changes, or in other words, a steep slope of the straight line portion $a$—$b$ of the operating characteristic may be obtained, resulting in extreme sensitivity of the conversion of the frequency changes into voltage or current amplitudes.

As pointed out, the discriminator 18 according to the invention is of the special type known as phase-shift or resonant discriminator, comprising at least one resonant impedance means such as a tuned circuit resonant to the normal frequency $f_0$ of the oscillator.

The discriminator circuit 22 is inductively coupled with the tuned output circuit 21 of the oscillator in such a manner that the oscillating voltage developed across the circuit 22 will be normally in quadrature phase relation with the voltage across the input circuit 21 and this normal phase relation will be increased or decreased, respectively, in direct proportion to the relative fgrequency departure between the oscillator frequency and the resonant frequencies of the circuits 21 and 22. By combining the primary and secondary voltages to produce the sum and difference thereof and rectifying the sum and difference voltages by means of the rectifiers 23 and 24, the differentially combined rectified voltages obtained from the output of the discriminator will vary substantially as shown in Figure 2 as a function of the relative frequency deviation between the oscillator frequency and resonant frequency of the discriminator circuit, in response to an initial movement of the galvanometer or other input element.

Other details of this balanced type of frequency discriminator shown in the drawings are well known and are omitted from the present specification as unnecessary for the understanding of the invention. The discriminator output voltage varying in the manner shown in Figure 2 serves to excite a relay 25 normally biased by means of a battery 26 or the like in such a manner as to close either of a pair of contacts 27 or 28 by attraction or release of the armature 30, depending upon the sense of departure of the oscillating frequency from its normal or starting frequency $f_0$.

The relay contacts 27 and 28 are connected to the secondary terminals of a power transformer 31 having its primary supplied from a suitable alternating current source such as an ordinary house lighting circuit, to which are furthermore connected the terminals 32 of one of the phase windings of a two-phase alternating current motor 33. The other phase winding of the motor having terminals 34 is connected to the central tap of the secondary winding of transformer 31 on the one hand and to the armature 30 of the relay 25 on the other hand. In order to produce two-phase current for operating the motor 33 from the single phase power supply, a condenser 35 serving as a phase-shifting element is connected in the primary supply winding for the motor, this and other details being well known to those skilled in the art.

In a system of the type described, an initial deflection of the galvanometer in one direction and corresponding change of the operating frequency produced by the oscillator 20 will result in the relay armature 30 closing one of the contacts 27 or 28, and vice versa, a deflection of the galvanometer in the opposite direction will result in a closing of the opposite relay contact, whereby to connect oppositely phased voltages supplied by either of the winding halves of the secondary of the transformer 31 to the motor 33. Accordingly, the latter will be set in rotation in either direction, depending upon the sense of the initial deflection of the galvanometer from its normal or starting position.

Motor 33 is shown to drive a pointer 35 or any other suitable output member by way of a pair of transmission gears 36 and 37. Pointer 35 may be associated with a dial carrying scale 38 representing units of an input magnitude to be indicated. Alternatively, the pointer 35 may be provided with a recording pen for directly recording the deflections of the galvanometer or other input device. Finally, the motor 33 may serve to operate any suitable control element such as a rudder or steering mechanism for automatically guiding a movable craft or vehicle in dependance upon a leader element or any variable magnitude or condition.

In order to restore and maintain a continuous frequency balance, the motor 33 is coupled mechanically with the variable condenser 40 of the oscillator tank circuit 17. For this purpose condenser 40 is advantageously a rotary plate conductor forming the sole tank circuit capacitance, or connected in parallel to a fixed tank circuit capacitator, as is readily understood. The direct coupling connection between the motor 33 or pointer 35 on the one hand and the tank circuit condenser 40 on the other hand, is indicated schematically by the dot-dash line 41 in the drawing. Accordingly therefore, an initial deflection of the galvanometer in a given direction and resulting starting of the motor in a corresponding direction will cause a change of the capacity of the tank circuit condenser 40 in such a manner as to substantially instantly restore the original frequency balance. In other words, the galvanometer will be deflected over its full operating range in proportion to its exciting current and the pointer 35 or other output element will follow the galvanometer displacement in a proportionate and continuously balanced follow-up relation.

An advantage of a balanced system or torque amplifier of this type is due to the fact that the employment of a frequency balance renders the system substantially independent of interference by disturbing currents such as supply voltage changes and other defects inherent in known arrangements using a current or voltage balance in the form of a Wheatstone bridge circuit or the like. Furthermore, the use of a specific type of discriminator embodying a resonant circuit or equivalent device as a discriminating element, makes it possible to obtain an extreme sensitivity of the system to a frequency unbalance in either direction from the balance frequency. This, as pointed out, is obtained by using a discriminator resonant circuit having an extremely high "Q" or low internal resistance, whereby to result in an extremely steep and highly sensitive operating characteristic $a—b$ as shown in Figure 2. In the normal use of a discriminator of this type, the sensitivity or steepness of the portion $a—b$ of the curve is limited by the range of variation of the input frequencies to be converted, such as in the case of a modulated radio signal in an FM radio receiver. A reduced frequency operating range in the case of the present invention is of no consequence, and in fact the range $f_1—f_2$ may be reduced and the sensitivity of the discriminator increased considerably, in view of the balance of the system upon the point $f_0$ and continuous automatic rebalance after the slightest initial deviation from the balance frequency, in a manner readily understood from the above.

Referring to Figure 3, there is shown a system similar to Figure 1, wherein the frequency balance is effected in the discriminator by using a simplified type of discriminator circuit embodying a single resonant circuit or equivalent resonant element of variable frequency directly controlled by the motor 54 or pointer 35. This electronic type of discriminator, also known as pentagrid or space charge discriminator, comprises a multi-electrode tube 45 having a first or inner control grid 46 which is connected to the cathode through a resonant circuit constituted by an induction coil 47 and a variable conductor 48. The latter is mechanically coupled with the motor 54 through a coupling connection schematically indicated at 50. The tube 45 has a second or outer control grid 51 separated from the inner control grid 46 by a screen grid 52 and excited by the oscillating frequency supplied from the output circuit 21 of the oscillator 20.

In a discriminator of this type, the output or plate current of the tube again varies in the manner as shown by the curve of Figure 2 as a function of either the oscillating frequency or capacity of the condenser 48, with this difference, however, that the output or plate current changes are superimposed upon the steady or quiescent plate current corresponding to the normal or balancing frequency $f_0$ and supplied by a suitable space current high voltage source, such as a battery 53. The plate current of the discriminator, in the example shown, is passed directly through the field winding of a direct current motor 54, the steady or quiescent component being balanced or neutralized by means of a balancing battery 55 or the like directly connected across the motor terminals. As is understood, the armature winding of the motor is energized from a suitable source, whereby to cause the motor to rotate in either direction depending upon the polarity of the balanced output current of the discriminator, i. e., in turn upon the sense of deviation of the generator frequency from the tuning frequency of the discriminator resonant circuit 47, 48.

Instead of directly energizing the motor 54 by the output current of the discriminator, the discriminator may serve to operate a polarized relay in the manner shown in Figure 1, which relay in turn serves to energize one or a pair of forward or reverse windings of the motor, in a manner readily understood.

Thus, again, the motor 54 will be started to rotate in either direction upon and during a departure of the oscillating frequency in either sense from the resonant or tuning frequency of the discriminator circuit.

There is shown in Figure 3 a modification of the invention in the form of a mechanically operated leader or input element controlling the frequency of the oscillator 20. For this purpose, the oscillating tank circuit comprises an inductance 56 shunted by a manually or otherwise controlled variable condenser having a fixed electrode 57 and a movable electrode 58. The latter carries an adjusting knob 60 cooperating with an adjusting scale 61. In this manner, a control of the condenser 57, 58 will be translated into a proportionate movement of the motor 54 and associated control device, whereby the system operates as a torque amplifier for remote indication or control and similar applications.

As is understood, with a system of this type, the input element or leader may be adjusted either continuously or in progressive steps to produce corresponding indications or controls of the output device. Furthermore, a system according to Figure 3 is especially suited for remote indication or control over long distances by means of a radio or carrier wave due to the fact that the pointer 35 is coupled with the discriminator tuned circuit rather than with the tank circuit of the oscillator as in the arrangement according to Figure 1. This makes it possible, for instance, in Figure 3, to transmit the signals of variable frequency appearing in the output of the oscillator 20 through an extended radio link to effect a corresponding indication or control at a remote point, such as for guiding distant objects through radio or other radiant energy.

The resonant circuit 47, 48 in Figure 3 may be replaced by a piezoelectric crystal shunted by a high ohmic resistance to obtain a high sensitivity or steepness of the discriminator characteristic as understood from the above.

Figure 4:
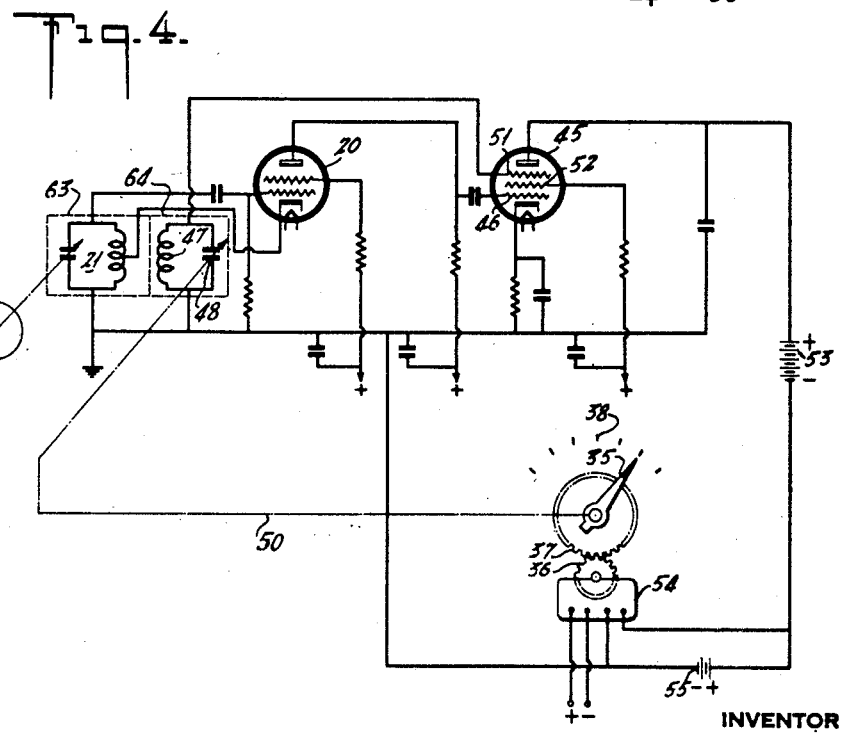

Referring to Figure 4, there is shown a further improvement of a balanced system or torque amplifier according to the invention, especially suited as an indicator or recorder. For this purpose, an input element or leader schematically indicated at 62 and which may be an electrical instrument or any other suitable device producing a mechanical movement in response to a variable input magnitude, again serves to control the frequency of an oscillator, the resulting frequency variations being detected by means of a pentagrid type discriminator 45 similar to the discriminator shown in Figure 3 and serving to control a motor 54 mechanically coupled with the discriminator resonant circuit 47, 48 for continuously rebalancing the system in substantially the same manner as described in connection with Figure 3.

In the present embodiment, the oscillator tank circuit 21 and the discriminator circuit 47, 48 are constructed of substantially identical elements or parts and mounted close to each other and shielded electrically by means of metallic shields indicated at 63 and 64. In this manner, any drift of the circuit constants of the circuits 21 and 47, 48 will be equal for both the circuits 21 and 47, 48, whereby to insure an exact frequency balance irrespective of any temperature, humidity or other influence affecting the circuit constants.

While there have been shown and described a few desirable embodiments of the invention, it is understood that this description is for the purpose of illustration and that various changes in shape, proportion and arrangement of parts and circuit elements, as well as the substitution of equivalent elements for those herein shown and described, may be made without departing from the spirit and scope of the invention as defined in the appended claims. The specification and drawings are, accordingly, to be regarded in an illustrative rather than in a limited sense.

I claim:

1. A torque amplifier comprising a primary movable element; a secondary movable element; a motor driving said secondary element; a frequency converter comprising a first resonant impedance means, a source of auxiliary high frequency voltage including a second resonant impedance means having a resonating frequency determinative of the source frequency, reactive coupling means between said first resonant impedance means and said source for developing a secondary high frequency voltage by said first impedance means having a phase normally at 90° with respect to the source voltage and varying in sense and magnitude in accordance with the relative frequency departure between said source and the resonant frequency of said first impedance means, said first and second impedance means being constituted of substantially identical reactance elements and being located in close proximity to each other, and further means for combining said secondary high frequency voltage with said source voltage to produce a direct output current having an amplitude varying in sense and magnitude in accordance with said frequency departure; means for controlling said motor in response to said output current to cause rotation thereof in either direction in dependance upon the sense of variation of said output current; first variable reactance means controlled by said primary element and arranged to form an effective tuning element of one of said resonant impedance means; and further variable reactance means controlled by said motor and arranged to form an effective tuning element of the other resonant impedance means, whereby to automatically restore the frequency balance between both said resonant impedance means and to maintain a continuous follow-up movement between said primary and said secondary elements.

2. A torque amplifier comprising, a primary movable element; a secondary movable element; a motor driving said secondary element; a frequency converter comprising a first resonant impedance means, a source of auxiliary high frequency voltage including a second resonant impedance means having a resonating frequency determinative of the source frequency, reactive coupling means between said first resonant impedance means and said source for developing a secondary high frequency voltage by said first impedance means having a phase normally at 90° with respect to the source voltage and varying in sense and magnitude in accordance with the relative frequency departure between said source and the resonant frequency of said first impedance means, said first and second impedance means being constituted by substantially identical reactance elements and located in close proximity to each other, and further means for combining said secondary high frequency voltage with said source voltage to produce a direct output current having an amplitude varying in sense and magnitude in accordance with said frequency departure; means for controlling said motor in response to said output current to cause rotation thereof in either direction in dependance upon the sense of variation of said output current; first variable reactance means controlled by said primary element and arranged to form an effective tuning element of said second resonant impedance means, and second variable reactance means controlled by said motor and arranged to form an effective tuning element of said first resonant impedance means, whereby to automatically restore a frequency balance between both said resonant impedance means and to maintain a continuous follow-up movement between said primary and said secondary elements.

3. A torque amplifier comprising, a primary movable element; a secondary movable element; an electric motor driving said secondary element; a frequency converter comprising an electronic tube having at least a cathode, an anode, a pair of control grids and a screen grid interposed between said control grids, a first resonant impedance means connected between said cathode and one of said control grids, a source of auxiliary high frequency voltage comprising a second resonant impedance means having a resonant frequency determinative of the source frequency and connected between the other control grid and said cathode, for producing a direct anode current having an amplitude varying in sense and magnitude according to the relative frequency departure between said source and the resonant frequency of said first impedance means, said first and second resonant impedance means being constituted by substantially identical reactance elements and located in close proximity to each other; means for controlling said motor in response to said anode current to cause rotation thereof in either direction in dependance upon the sense of variation of said anode current; first variable reactance means controlled by said primary element and arranged to form an effective tuning element of one of said resonant impedance means; and further variable reactance means controlled by said motor and arranged to form an effective tuning element of the other resonant impedance means, whereby to automatically restore a frequency balance between said first and second resonant impedance means and to maintain a continuous follow-up movement between said primary and secondary elements.

4. A torque amplifier comprising, a primary movable element; a secondary movable element; an electric motor driving said secondary element; a frequency converter comprising an electronic tube having at least a cathode, an anode, a pair of control grids and a screen grid interposed between said control grids, a first resonant impedance means connected between said cathode and one of said control grids, a source of auxiliary high frequency voltage comprising a second resonant impedance means having a resonant frequency determinative of the source frequency and connected between the other control grid and said cathode, for producing a direct anode current having an amplitude varying in sense and magnitude according to the relative frequency departure between said source and the resonant frequency of said first impedance means, said first and second resonant impedance means being constituted by substantialy identical reactance elements and located in close proximity to each other; means for controlling said motor in response to said anode current to cause rotation thereof in either direction in dependance upon the sense of variation of said anode current; first variable reactance means controlled by said primary element and arranged to form an effective tuning element of said second resonant impedance means; and second variable reactance means controlled by said motor and arranged to form an effective tuning element of said first resonant impedance means, whereby to automatically restore the frequency balance between both said first and second resonant impedance means and to maintain said primary and secondary elements in a continuously balanced follow-up movement.

KARL RATH.

REFERENCES CITED

The following references are of record in the file of this patent:

UNITED STATES PATENTS

| Number | Name | Date |
| --- | --- | --- |
| 2,303,654 | Newton | Dec. 1, 1942 |
| 2,320,996 | Alexandersson et al. | June 8, 1943 |